United States Patent
Evans et al.

(10) Patent No.: US 7,921,223 B2
(45) Date of Patent: Apr. 5, 2011

(54) PROTECTED DISTRIBUTION AND LOCATION BASED AGGREGATION SERVICE

(75) Inventors: Greg Evans, Raleigh, NC (US); Hugh Svendsen, Chapel Hill, NC (US); Olivia Marsh, Raleigh, NC (US)

(73) Assignee: Lemi Technology, LLC, Wilmington, DE (US)

( * ) Notice: Subject to any disclaimer, the term of this patent is extended or adjusted under 35 U.S.C. 154(b) by 176 days.

(21) Appl. No.: 12/314,324

(22) Filed: Dec. 8, 2008

(65) Prior Publication Data

US 2010/0146135 A1   Jun. 10, 2010

(51) Int. Cl.
 *G06F 15/16* (2006.01)
(52) U.S. Cl. ........ 709/231; 709/225; 709/223; 713/189; 713/163; 713/160
(58) Field of Classification Search .......... 709/231, 709/225, 223
 See application file for complete search history.

(56) References Cited

U.S. PATENT DOCUMENTS

| | | | |
|---|---|---|---|
| 6,985,694 B1 | 1/2006 | De Bonet et al. | |
| 7,484,103 B2 * | 1/2009 | Woo et al. | 713/189 |
| 2002/0184339 A1 | 12/2002 | Mackintosh et al. | |
| 2004/0117500 A1 * | 6/2004 | Lindholm et al. | 709/231 |
| 2004/0254886 A1 * | 12/2004 | Siepen et al. | 705/51 |
| 2005/0198097 A1 | 9/2005 | Kalnitsky | |
| 2006/0167985 A1 * | 7/2006 | Albanese et al. | 709/203 |
| 2006/0269058 A1 | 11/2006 | Kessler et al. | |
| 2007/0147411 A1 | 6/2007 | Bijwaard et al. | |
| 2008/0307108 A1 * | 12/2008 | Yan et al. | 709/231 |

OTHER PUBLICATIONS

Ashutosh Dutta et al., "MarconiNet Supporting Streaming Media over Localized Wireless Multicast" Columbia University; Jun. 2002.

* cited by examiner

*Primary Examiner* — Jude J Jean Gilles
(74) *Attorney, Agent, or Firm* — Withrow & Terranova, PLLC

(57) ABSTRACT

A system for and method of per access-point streaming media customization and privacy protected feedback in a wireless network. The system is operative to: encrypt real time streamed media content from a streaming media source; multicast the streamed encrypted media content for availability to a user device for playback, the user device sending out unicast responses at the time of joining or dropping the multicast; aggregate the unicast responses in the form of a connect multicast state or a disconnect multicast state of the user device based on the joining or dropping of the multicast; and provide information back to the streaming media source based on the aggregated unicast responses.

31 Claims, 9 Drawing Sheets

PROTECTED DISTRIBUTION AND LOCATION BASED AGGREGATION SERVICE

FIELD OF THE INVENTION

The present application relates to a system for and method of per access-point streaming media customization and privacy protected feedback in wireless networks such as bandwidth constrained wide area network (WAN) connected IPv6 mobile networks.

BACKGROUND OF THE INVENTION

Even with the popularity of MP3 players and smart mobile phones, such as iPhones®, for portable content storage and playback, terrestrial radio broadcasts continue to generate more than $20 billion annually in advertisement (ad) revenue. However, approximately 75% of this revenue is generated from localized ad insertion. As large radio station conglomerates transition from traditional terrestrial broadcasting to a primary focus on internet delivery, they will inevitably need to develop new business models to address local vendor ad opportunities.

In view of the foregoing, leveraging long-term-evolution (LTE) and global positioning system (GPS) mobile features without compromising listener privacy for streaming media will be a desire of internet radio and wireless carrier providers.

In addition to the radical changes of traditional (ad based) radio distribution as owners shift to primarily internet distribution, a concurrent secondary paradigm shift will occur within wireless data distribution and their associated backhaul networks. Basically, as fiber is built out to the towers to handle LTE and Wi-Max, the bandwidth choke points will move from backhaul to available wireless spectrum. Accordingly, US wireless carriers will necessarily require more efficient systems to allow internet radio distribution over their mobile LTE and Wi-Max networks.

SUMMARY OF THE INVENTION

According to one aspect, the present invention provides a system and method that regulate access to multicast streamed content from bandwidth constrained IPv6 access points.

According to another aspect, the present invention provides a system for per access-point streaming media customization and privacy protected feedback in a wireless network, comprising: means for encrypting real time streamed media content from a streaming media source; means for multicasting the streamed encrypted media content for availability to a user device for playback, the user device sending out unicast responses at the time of joining or dropping the multicast; means for aggregating the unicast responses in the form of a connect multicast state or a disconnect multicast state of the user device based on the joining or dropping of the multicast; and means for providing information back to the streaming media source based on the aggregated unicast responses.

The streaming media source may be an internet radio, and the user device may comprise a mobile device, such as a smart phone or a portable media device.

The wireless network may comprise a bandwidth constrained wide area network (WAN) connected IPv6 mobile network.

The unicast response from the mobile device may further include at least one of a unique mobile device identification (ID) or a location coordinate of the mobile device.

The unicast response from the mobile device may further include a unique mobile device identification (ID), a location coordinate of the mobile device, a streaming media source ID request, and a timestamp.

The location coordinate may be determined via a global positioning system (GPS).

The streamed encrypted media content may be encrypted with a digital rights management (DRM) key.

The information provided back to the internet radio as the streaming media source may include at least one of a radio tower identification (ID), a timestamp, a channel selected, a channel de-selected or a channel global positioning position (GPS).

The invention further provides a method of per access-point streaming media customization and privacy protected feedback in a wireless network, the method comprising: encrypting real time streamed media content from a streaming media source; multicasting the streamed encrypted media content for availability to a user device for playback, the user device sending out unicast responses at the time of joining or dropping the multicast; aggregating the unicast responses in the form of a connect multicast state or a disconnect multicast state of the user device based on the joining or dropping of the multicast; and providing information back to the streaming media source based on the aggregated unicast responses.

The present invention also contemplates a computer readable medium comprising a program for instructing the system to perform the above-described operations.

According to a still further aspect, the present invention provides a mobile wireless access device, comprising: a network interface communicatively coupling the mobile wireless access device to a network server; a controller associated with the network interface and operative to: transmit location coordinate information, an access-point identification (ID), and a streaming media ID request to the network server; receive an encrypted streamed media multicast from the network server; receive a multicast unique key for streamed content decryption; decrypt the streamed content for playback by a player function; transmit a successful connection and decryption of the streamed media multicast back to the network server; and transmit a termination of the connection of the streamed media multicast back to the network server.

There has thus been outlined, some features consistent with the present invention in order that the detailed description thereof that follows may be better understood, and in order that the present contribution to the art may be better appreciated. There are, of course, additional features consistent with the present invention that will be described below and which will form the subject matter of the claims appended hereto.

In this respect, before explaining at least one embodiment consistent with the present invention in detail, it is to be understood that the invention is not limited in its application to the details of construction and to the arrangements of the components set forth in the following description or illustrated in the drawings. Methods and apparatuses consistent with the present invention are capable of other embodiments and of being practiced and carried out in various ways. Also, it is to be understood that the phraseology and terminology employed herein, as well as the abstract included below, are for the purpose of description and should not be regarded as limiting.

As such, those skilled in the art will appreciate that the conception upon which this disclosure is based may readily be utilized as a basis for the designing of other structures, methods and systems for carrying out the several purposes of the present invention. It is important, therefore, that the claims be regarded as including such equivalent constructions insofar as they do not depart from the spirit and scope of the methods and apparatuses consistent with the present invention.

BRIEF DESCRIPTION OF THE DRAWINGS

The accompanying drawing figures incorporated in and forming a part of this specification illustrate several aspects of the invention, and together with the description serve to explain the principles of the invention.

DETAILED DESCRIPTION OF THE PREFERRED EMBODIMENTS

The embodiments set forth below represent the necessary information to enable those skilled in the art to practice the invention and illustrate the best mode of practicing the invention. Upon reading the following description in light of the accompanying drawing figures, those skilled in the art will understand the concepts of the invention and will recognize applications of these concepts not particularly addressed herein. It should be understood that these concepts and applications fall within the scope of the disclosure and the accompanying claims.

Figure 1:
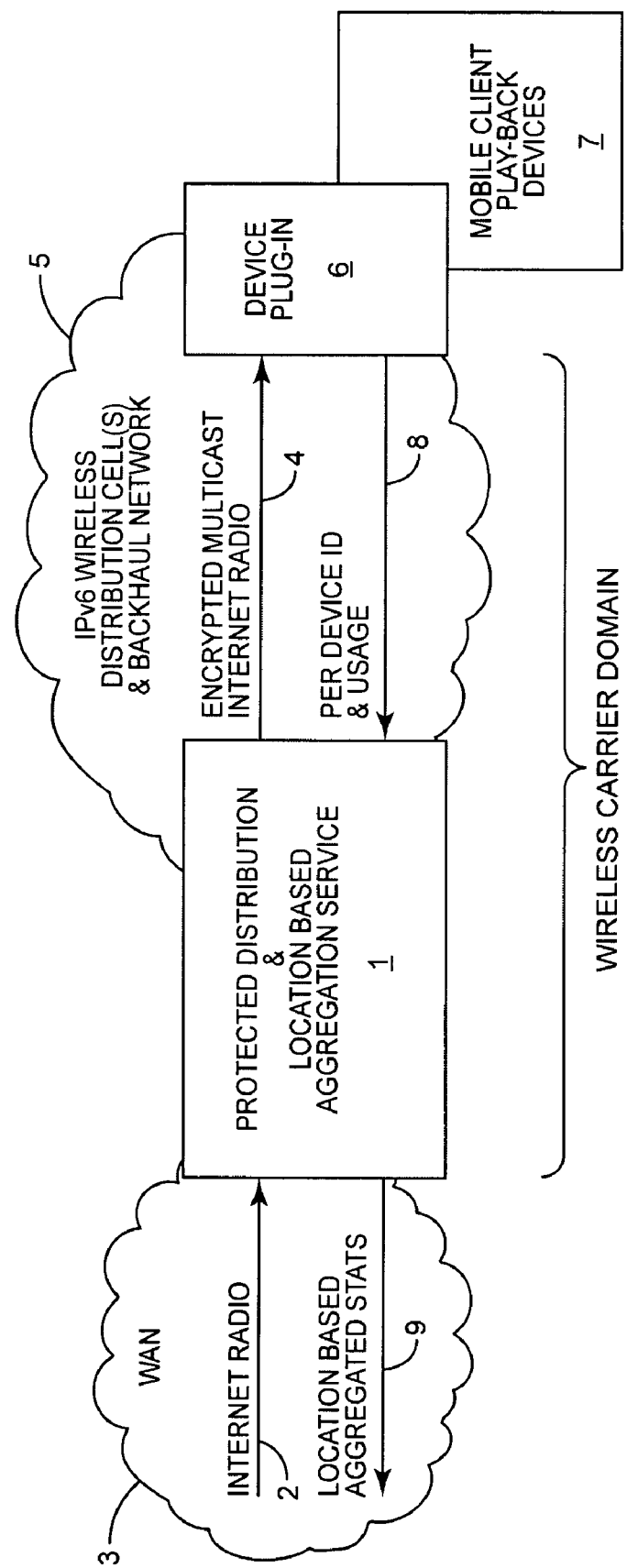
FIG. 1 illustrates a top level system diagram according to an exemplary embodiment of the present invention.

FIG. 1 is a top level system diagram showing the central service and client plug-in functions according to an exemplary embodiment of the present invention. These functions would typically be provided by or under the control of a wireless network owner. More specifically, the system shown in FIG. 1 is designed to regulate access to multicast streamed content from bandwidth constrained IPv6 access points. For the sake of clarity, internet radio distribution over a long-term-evolution (LTE) carrier-based wireless network will be described as an exemplary embodiment.

As shown in FIG. 1, a protected distribution and location based aggregation service 1, in the form of a central server, receives internet radio feeds as shown by communication input 2 from the WAN 3 and encrypts prior to distributing as at 4 within the wireless carrier's network such as IPv6 wireless distribution cell(s) and backhaul network 5. A device plug-in 6 provided to users' mobile client playback devices 7 provides a decryption function. The plug-in device 6 also provides a usage data feedback as shown by communication input 8 to the protected distribution and location based aggregation service 1. The service 1 summarizes the usage data and makes location based aggregated statistics available as shown by communication output 9 back to the internet radio stations or other third parties.

Figure 2:
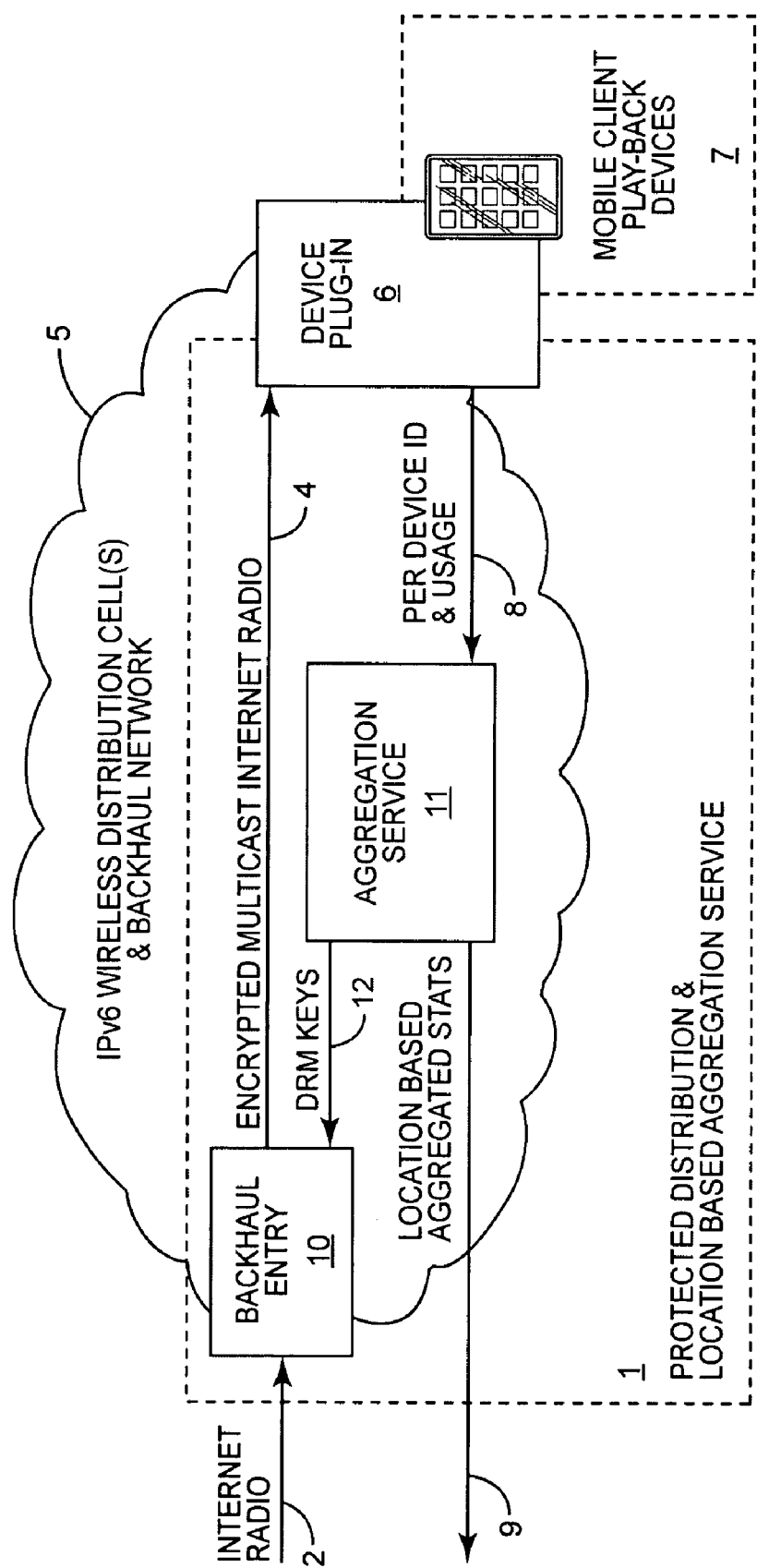
FIG. 2 is a system diagram illustrating further details of a protected distribution and location-based aggregation service according to an exemplary embodiment of the present invention.

FIG. 2 is a system diagram illustrating further details of the protected distribution and location based aggregation service 1 according to an exemplary embodiment of the present invention. In particular, as shown in FIG. 2, the central server of the service 1 includes a separate backhaul entry 10 and an aggregation service 11. The backhaul entry 10 is responsible for the encryption of each Internet radio 2. The separation allows the function to be located at the source of the Internet radio station or at the most cost-effective point in the carrier network. Each backhaul entry point 10 receives DRM keys as shown by communication input 12 from the aggregation service 11 for encryption of each internet radio 2.

Figure 3:
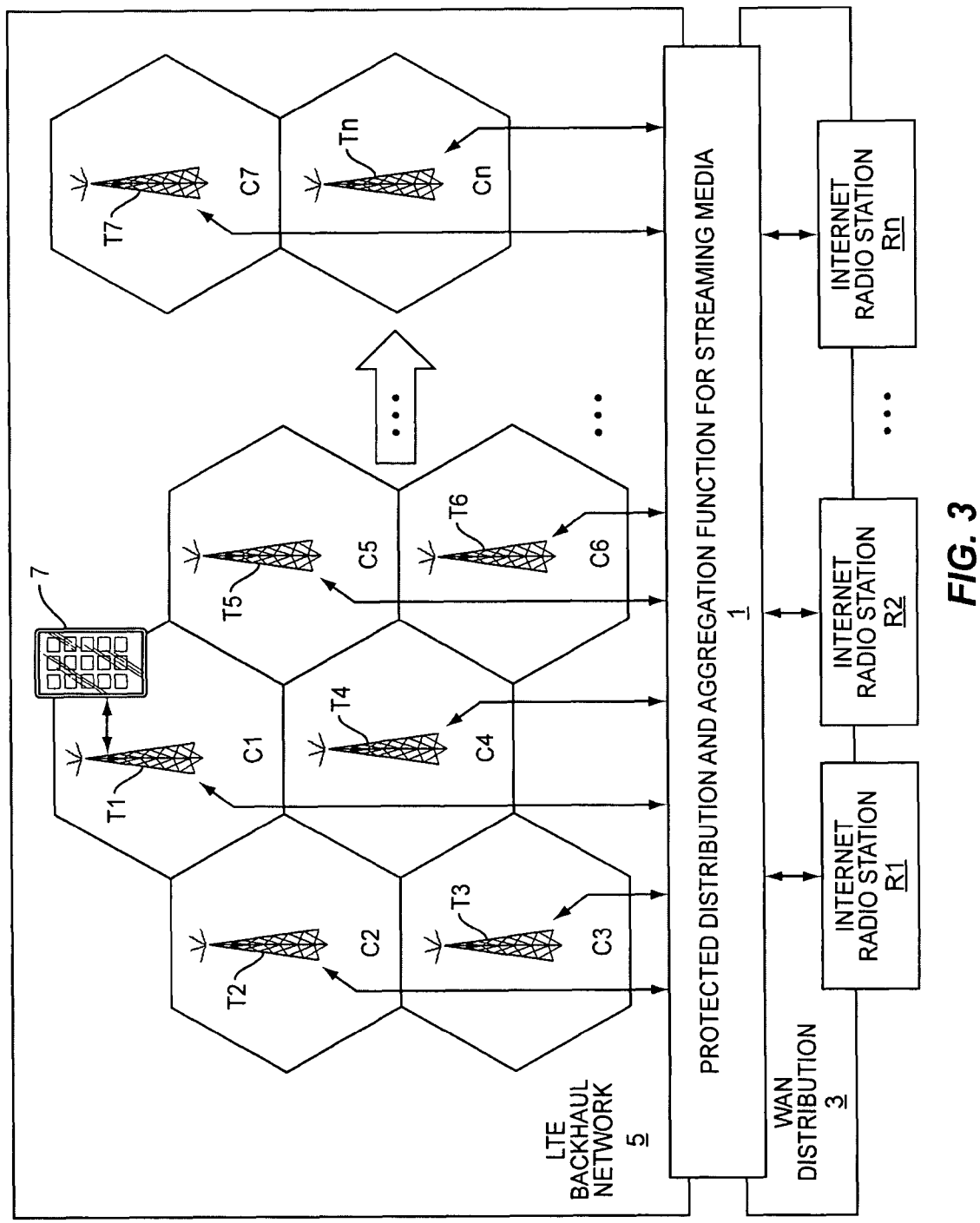
FIG. 3 illustrates a system scaling base on tower and internet radio station according to an exemplary embodiment of the present invention.

A service 1 consistent with the present invention is well suited to support many internet radio stations R1, R2, . . . Rn across many carrier access points as shown in FIG. 3. Using the example of LTE, a system consistent with the present invention will support a large group of wireless cells C1, C2, C3, C4, C5, C6, C7, . . . Cn (or carrier access points) for mobile devices 7. At cell sizes of 5 kilometers, LTE can support spectrum slices as narrow as 1.25 MHz or as wide as 20 MHz. With 4×4 multiple input, multiple output (MIMO) antenna technology, LTE can achieve more than 300 megabits per second (Mbps) total across 200 mobile devices 7. At 128 kilobits per second (Kbps) per internet radio channel, reserving some amount of LTE spectrum per tower/cell for multicast distribution would be a logical plan for carriers. In this scenario, leveraging the two way capabilities of LTE to collect real-time aggregated listener statistics could be of high economic value to radio station owners. True royalty calculation could be performed on a per song per play basis to obtain accurate reporting back to content owners. Additionally, collected location based statistics for listeners could allow better target advertising for ad slots. Again, ads could be late-binded on a per tower T1, T2, T3, T4, T5, T6, T7, . . . Tn basis using, for example, vendor defined rule sets on geographic locations as described in copending U.S. application Ser. No. 12/189,861, filed Aug. 12, 2008 entitled "Method for Location Based Advertising Based on Binding Bids to User Defined Arbitrary Shapes", the contents of which are incorporated herein by reference.

Scaling of this system could be on a regional basis or the carrier could backhaul their entire network for this function to a single data or network operations center (NOC). With carrier plans to implement fiber based backhauls, this may be the most cost effective solution. However, reliability (or downtime) risks per number of listeners would be much higher. Multiple deployments on a regional scenario may be easier to manage from a business and technical implementation when supporting local vendors and local radio stations.

Figure 4:
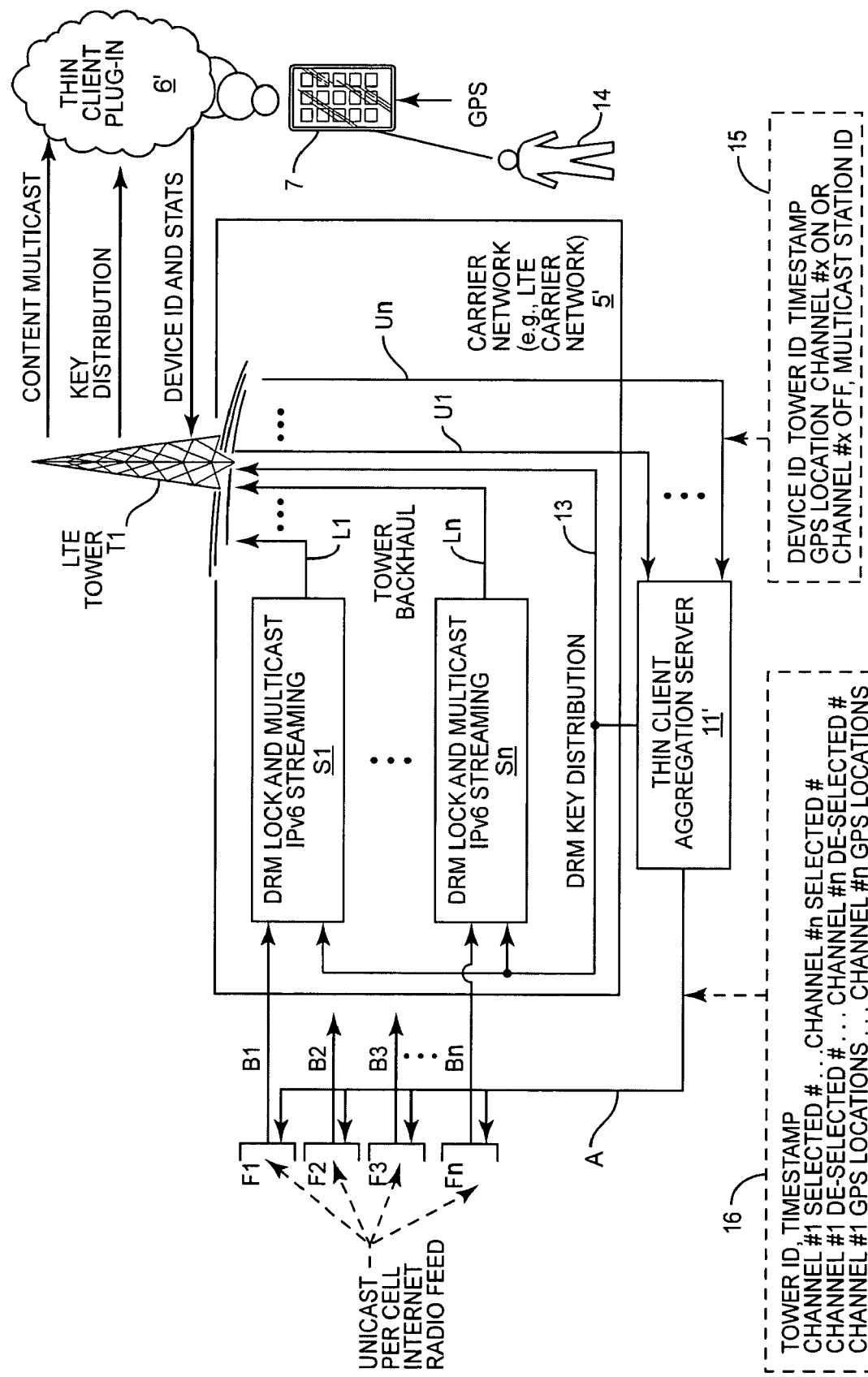
FIG. 4 is a more detailed diagram illustrating additional details for serving a single access point or tower as shown in connection with FIG. 3.

FIG. 4 is a more detailed diagram illustrating additional details for serving a single access point or tower (e.g., T1) as shown in connection with FIG. 3. A backhaul entry point B1, B2, B3, . . . Bn is provided for each radio station feed F1, F2, F3, . . . Fn targeted for a given tower. As discussed earlier, the entry point may be within the carrier's network or located at the radio station source (or any point in-between). At this entry point B1, . . . Bn, the streamed content is encrypted with a DRM key as shown by DRM key distribution 13 provided by the thin client aggregation server 11'. Keys may also be generated locally at the entry point, but this approach may require more management overhead in large networks. The encrypted internet radio content with the key is DRM locked and multicast IPv6 streamed as shown at S1, . . . Sn and output as shown by L1, . . . Ln to the given tower such as T1 for multicast availability by mobile playback devices 7. The encryption re-streaming function happens in real-time with minimal buffering that would add delay to the internet radio station R1, . . . Rn broadcast.

As a client such as a user 14 having a mobile client playback device 7, such as but not limited to a smart phone including an iPhone®), joins the multicast, the key is used by a thin client plug-in 6' to decrypt the signal (note that the term "thin client" as used herein simply refers to the fact that either a program or hardware device relies on having most or all of its functionality supplied by a network server). At the time of joining or dropping a multicast, the thin client plug-in 6' sends a unicast response U1, . . . Un to the thin client aggregation server 11'. Information for the unicast response U1, . . . Un includes (but is not limited to) the following (see the broken line box labeled 15 in FIG. 4):

Unique mobile device identification (ID) (embedded serial number, media access control (MAC) address, etc.);
Multicast station ID (unique to radio station);
Tower ID (if common multi-cast address used between towers);
Timestamp;
Location of device via GPS (or other location identifying system); and
State of "turning on" or "turning off" given multicast.

For further security, the client may require the unicast response U1, . . . Un to be acknowledged by the thin client aggregation server 11'. This would keep the device from being hacked to intercept or block the responses to the thin client aggregation server 11'. Transmission control protocol (TCP) (layer-4) would satisfy this requirement.

The architecture of the thin client plug-in 6' (i.e., executable) is protected such that the client cannot be (easily) modified. Even though the key is public, the actual encryption and decryption algorithms are kept proprietary. Alternately, the digital rights management (DRM) key may be encrypted. The internals of the plug-in 6' would know how to decrypt the key. For a given carrier, a single type of plug-in with a single hidden key could be used. One skilled in the art would recognize many methods to use DRM to protect multicast transmission over the wireless network.

Finally, the unicast responses U1, . . . Un are aggregated at the thin client aggregation server 11' and provided in one or more formats back to the radio station or other third parties as shown by feedback A. As shown by the broken line box labeled 16 in FIG. 4, the information fed back to the radio station includes, but is not limited to, tower ID, timestamp, channel selected, channel de-selected and channel GPS locations. However, individual device IDs remain private to the carrier's network (i.e., the thin client aggregation server 11' must remain with the premises and control of the carrier or provider).

Figure 5:
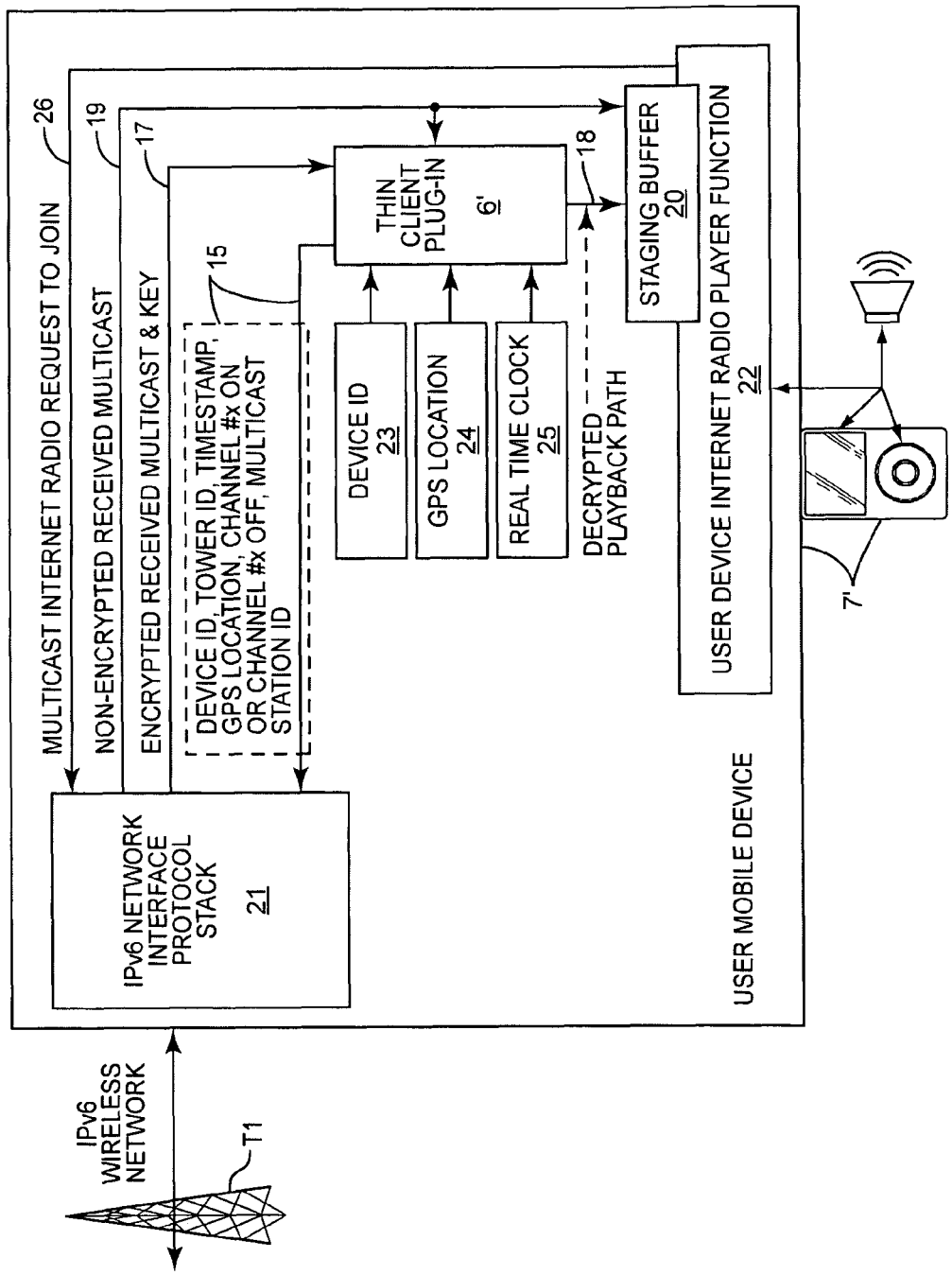
FIG. 5 illustrates a block diagram showing the basic operation of a thin client plug-in according to an exemplary embodiment of the present invention.

FIG. 5 illustrates a block diagram showing the basic operation of a thin client plug-in function according to an exemplary embodiment of the present invention. The actual implementation may be hardware, software, or firmware; or some combination thereof. The thin client functionally resides between the network interface, as shown at IPv6 network interface protocol stack 21 which communicates with the network server, and the playback function as shown at user device internet radio player function 22 of the user mobile device 7' (in this case shown as a portable media device such as an iPod®). A staging buffer 20 or other memory function may be required allowing smooth transitions between tower T1 handoffs of the streamed content. The thin client plug-in 6' serves as a controller primarily responsible for identifying the encrypted multicast shown as encrypted received multicast and key 17, obtaining the key from the multicast, and decrypting the signal before supplying the signal through decrypted playback path 18 to the staging buffer 20. To accomplish this, the thin client plug-in 6' may be required to monitor all received multicasts 19. The thin client plug-in 6' also has access to the device ID function 23, GPS location function 24, and real time clock function 25 resident to the device. This information is used as previously described for tagging of responses when joining (see reference line 26) or disconnecting from a multicast.

Figure 6:
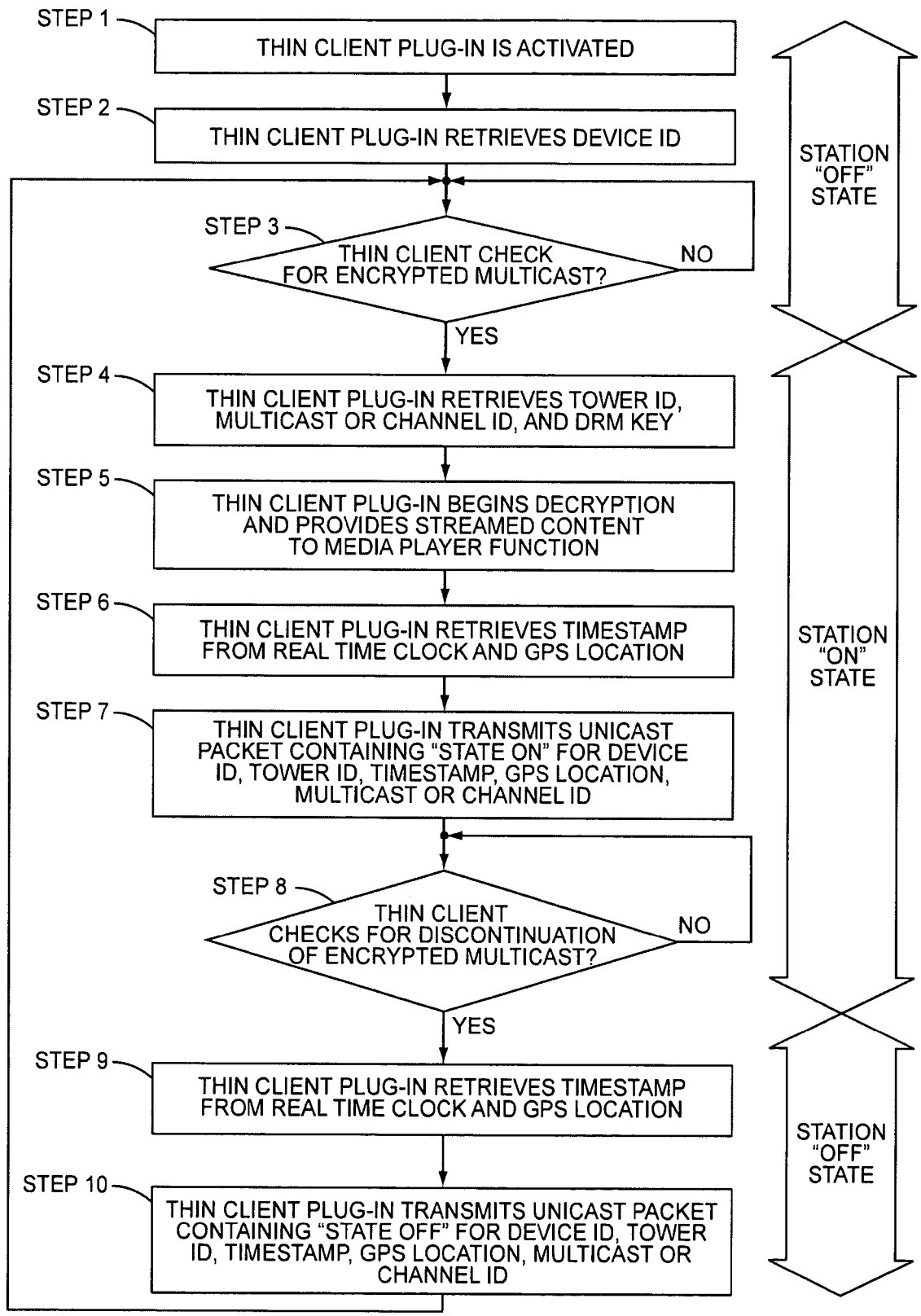
FIG. 6 is an operation flowchart illustrating a client plug-in according to an exemplary embodiment of the present invention.

FIG. 6 is a flowchart showing the basic operation of the thin client plug-in 6'. The thin client plug-in 6' operates between two basic modes or states, either a station "on" state or a station "off" state. In the station "on" state, the user mobile device 7' is connected to a streamed multicast session from a given access point. Steps 4 through 8 are in a station "on" state operation. Steps 1 through 3, 9 and 10 are station "off" states. Each time a state transfers from one to the other (step 3 to "on"; or step 8 to "off"), the thin client plug-in 6' identifies to the central service or centralized controller such as the thin client aggregation server 11' the state change, device ID, device location, station ID, and tower ID. This thin client plug-in process may be active whenever the user mobile device 7' is on, or only be activated through an internet radio (or other streaming media) application.

More specifically, in step 1 the thin client plug-in 6' is activated. In step 2, the thin client plug-in 6' retrieves the device ID 23. The thin client plug-in 6' then checks for encrypted multicast 17. If no encrypted multicast 17 is received, then the thin client plug-in 6' continues to check for encrypted multicast 17 (see step 3). If, on the other hand, the thin client plug-in 6' finds an encrypted multicast 17, then the method proceeds to step 4, where the thin client plug-in 6' receives the tower ID, the multicast or channel ID, and the DRM key.

Moreover, as noted above, when moving between step 3 and step 4, a change of state occurs and the thin client plug-in 6' is now in a station "on" state. In step 5, the thin client plug-in 6' begins the decryption and provides streamed content to the media player function 22. In step 6, the thin client plug-in 6' retrieves the timestamp from the real-time clock 25 and GPS location 24. In step 7, the thin client plug-in 6' transmits a unicast packet U1, . . . Un containing "state on" for the device ID, the tower ID, the timestamp, the GPS location, and the multicast or channel ID (see the broken line box labeled 15 in FIGS. 4 and 5). In step 8, the thin client plug-in 6' then checks for discontinuation of the encrypted multicast 17. If the encrypted multicast 17 has not discontinued, then the thin client plug-in 6' continues to check for such discontinuation of the encrypted multicast 17. On the other hand, if the thin client plug-in checks and finds that the encrypted multicast 17 has discontinued, then the method moves on to step 9. As noted above, when moving between step 8 and step 9, a change of state occurs and the thin client plug-in 6' is now in a station "off" state.

In the station "off" state, the thin client plug-in 6' then retrieves the timestamp from the real-time clock 25 and GPS location 24 as shown in step 9. In step 10, the thin client plug-in 6' transmits a unicast packet U1, . . . Un containing "state off" for the device ID, the tower ID, the timestamp, the GPS location, and the multicast or channel ID (see the broken line box labeled 15 in FIGS. 4 and 5). The thin client plug-in operation then returns to a point just prior to step 3 to again check for an encrypted multicast 17.

Figure 7:
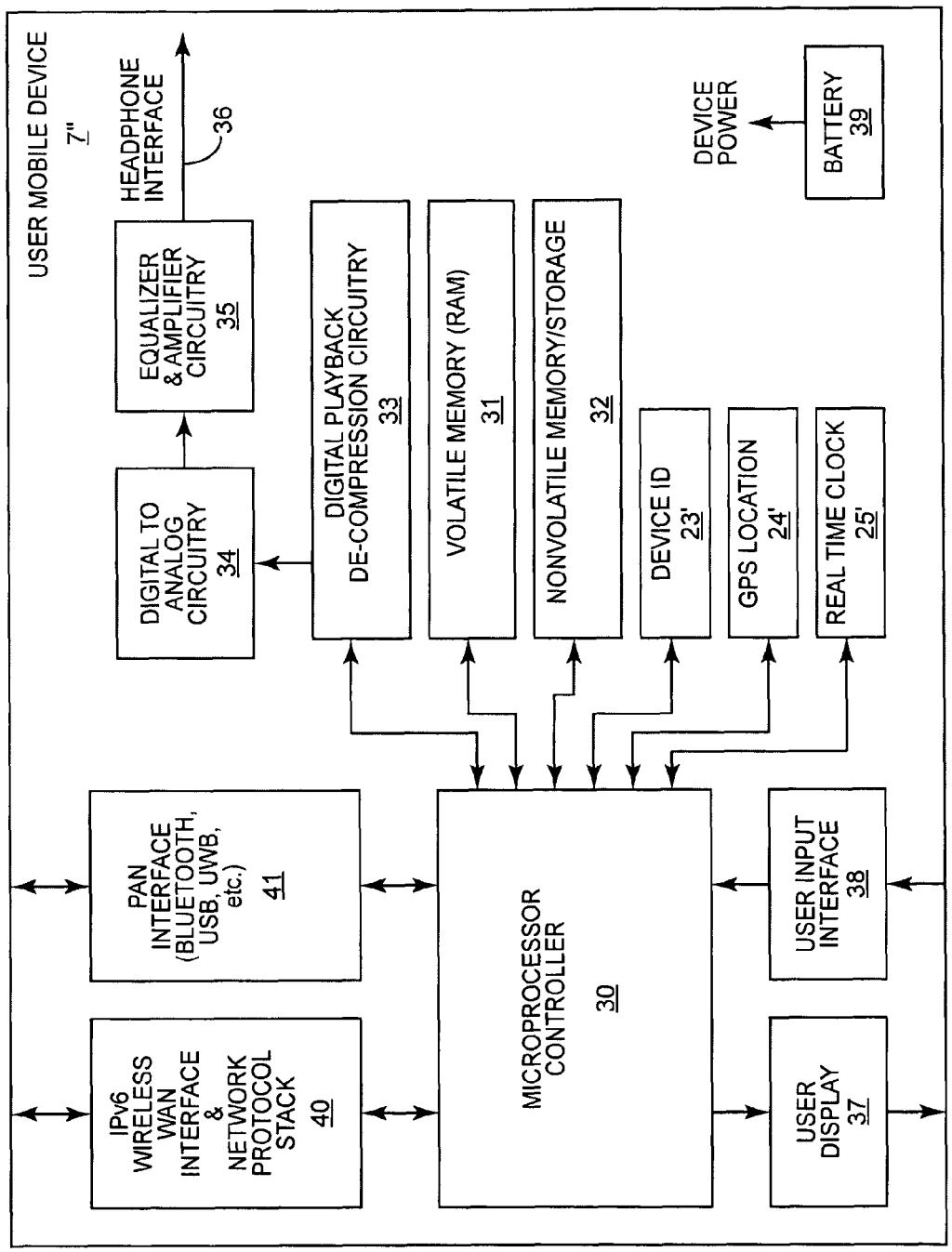
FIG. 7 illustrates an example of a platform for a mobile device for implementation of the present invention.

FIG. 7 illustrates an example of a platform for a user mobile device 7" for implementation of the present invention. The microprocessor 30 provides a controller for operation of the thin client plug-in. Volatile memory 31, such as random access memory (RAM) and non-volatile memory/storage 32 allow for temporary and long-term storage of associated applications and received content. Playback of the received internet radio station is supported by digital playback decompression circuitry 33, digital to analog conversion circuitry 34, equalizer and amplifier circuitry 35, a headphone interface 36, device ID 23', GPS receiver 24' and real time clock 25'. A user display 37, user interface 38 and battery 39 for device power would be typical of a smart phone or other mobile device with internet connectivity and content storage/playback functions. As the central entity, the microprocessor 30 provides interfaces to the Wide Area Network (WAN) 40, Local Area Network (LAN), and possibly Personal Area Network (PAN) 41. The WAN interface 40 allows for required on-line connections for receiving internet radio, and playback statistics reporting by the thin client.

EXAMPLE

Figure 8A:
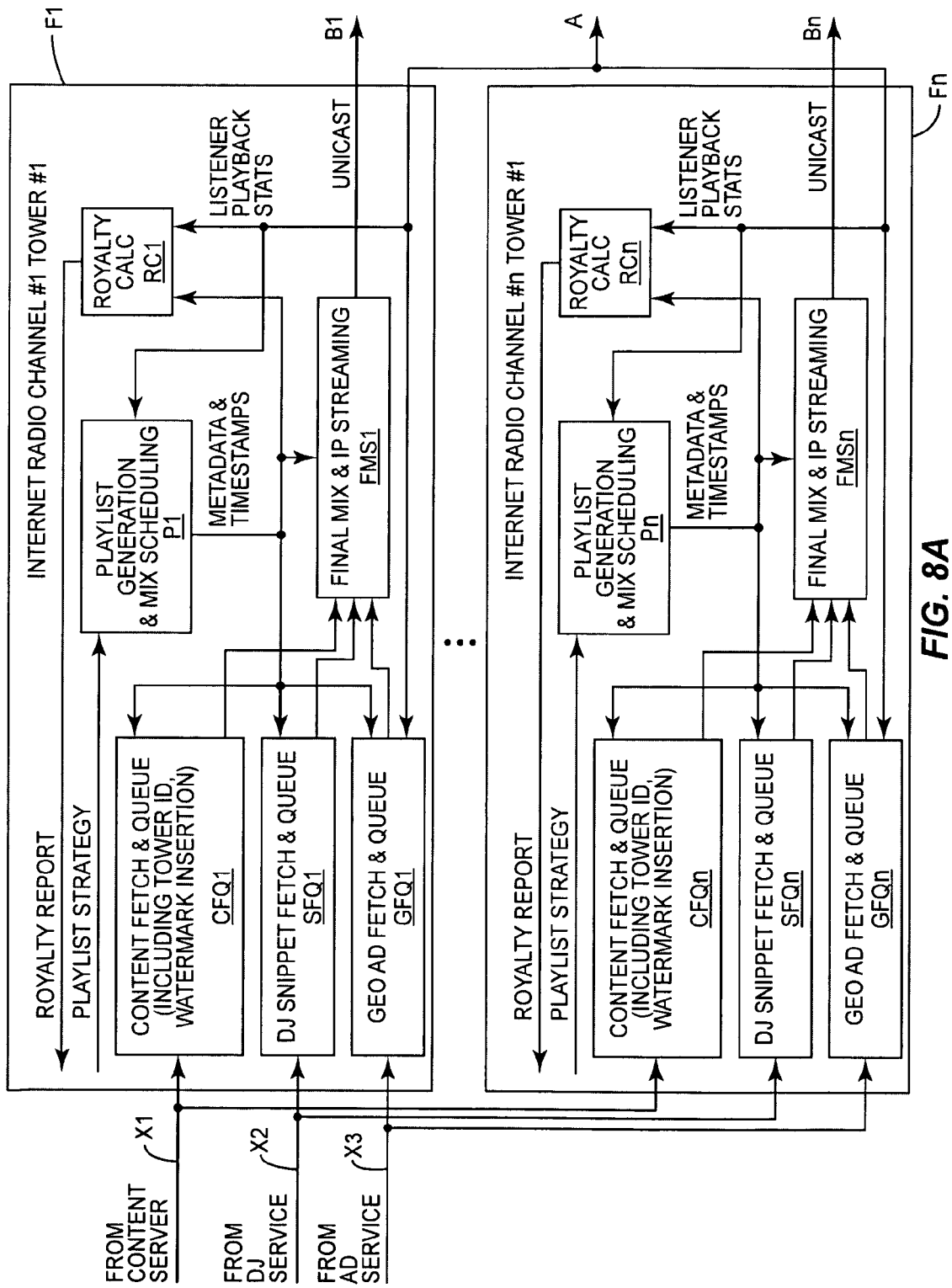
FIGS. 8A and 8B illustrate an example of a use-case ecosystem showing a scenario for implementation of the present invention.
Figure 8B:
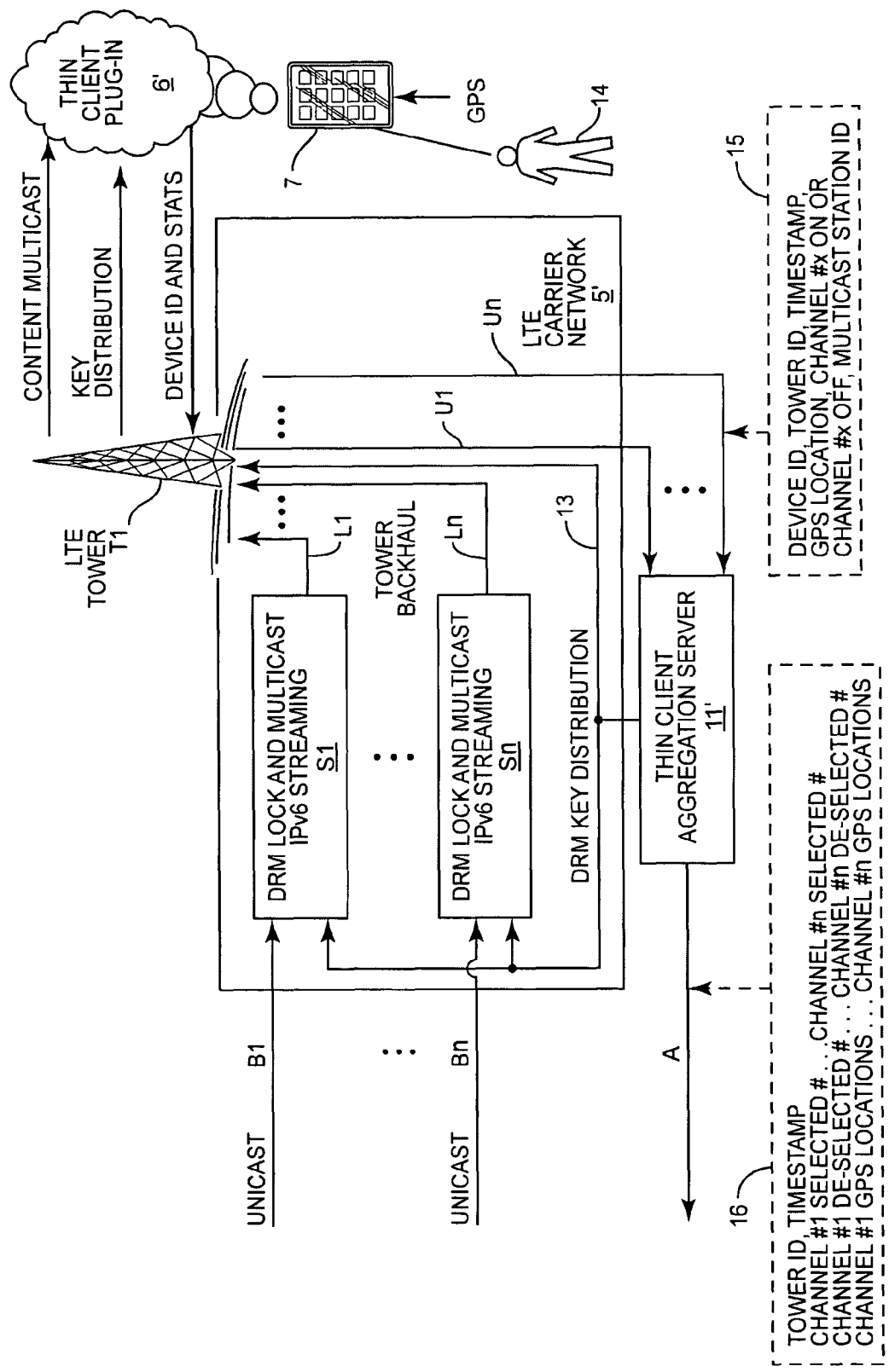

Use-case ecosystem showing a scenario for implementation of the present invention With reference to FIGS. 8A and 8B, the following describes a exemplary scenario for implementation of the present invention utilizing ClearChannel and Verizon over an LTE network infrastructure:

1. As Verizon deploys LTE wireless technology through their network, they allocate in 10 Mbps (for each 100 Mbps of 20 MHz spectrum) for streaming multicast internet radio.

2. ClearChannel enters a business relationship with Verizon to use up to 2 Mbps of streaming bandwidth from each of Verizon's LTE tower access points in the real-time transport protocol (RTP) area for internet radio distribution as a customized simulcast option to their existing terrestrial radio broadcasts.

3. ClearChannel subdivides the leased 2 Mbps into 15 independent radio stations on each LTE tower access point streaming at 128 kbps per station. ClearChannel groups these 15 stations into 5 jazz, 5 country, and 5 rock formats. Example for the genres of the 5 rock formats could be (1) classic rock, (2) big-hair, (3) pop rock, (4) alternative, and (5) indie.

4. ClearChannel provides a per tower per station internet radio capability as shown in FIG. 8A. Key components and functionality include playlist generation/scheduling P1, . . . Pn, content fetch/queue CFQ1, . . . CFQn, DJ snippet fetch/queue SFQ1, . . . SFQn, geographic based ad fetch/queue GFQ1, . . . GFQn, final mixing/internet protocol (IP) streaming FMS1, . . . FMSn, and royalty calculation RC1, . . . RCn. Centralized or distributed servers X1, X2 and X3 house this shared content for music, disc jockey (DJ) snippets or segments and ads, respectively.

5. Each radio channel receives a playlist strategy (i.e., classic rock, etc.) from which a playlist and time-of-play scheduling is generated. As an alternate embodiment, a single playlist may be generated for each station type for common station use with each LTE tower (i.e., all LTE towers would have the same classic rock playlist and time of play schedule. This scenario allows listeners to seamlessly transition between LTE towers while listening to a song on a given station. Metadata and timestamps are used by each of the fetch functions to retrieve music, DJ, and ad content just prior to final mixing and streaming towards the Verizon LTE backhaul network. Even though a single playlist is used between towers, the DJ and ad content would be different. (i.e., Clients may be required to have a buffering function to keep skips from happening during tower T1 transition while DJ snippets or ads are being played.)

6. As Verizon receives each stream radio station B1, . . . Bn for each tower T1, . . . Tn, the content is encrypted as previously described for FIG. 4 (and shown again in FIG. 8B). After encryption, the content is re-streamed via multicast functionality of the LTE carrier network. In addition to the encrypted content, the DRM key is routinely sent with the multicast. Each radio station may have its own unique multicast (i.e., multicast address) or all stations (or groups of stations) may be within a single multicast with sub-channel identifiers on a per station basis.

7. Each Verizon customer (user 14) that wishes to listen to internet radio on the LTE network must download (or have installed) the thin client plug-in 6' as described in FIG. 5. The encryption is matched to only operate with this plug-in when the key is provided. Since the radio stations are ad supplemented, the plug-ins are provided at no or minimal charge and all plug-ins are identical (at least in functionality). Plug-ins may have to be customized on a per type of handset basis, but not on a per user basis (i.e., Hardware/firmware specifics of a Nokia handset may require a different plug-in than a Motorola handset).

8. As a given Verizon customer selects internet radio, the steps of FIG. 6 execute to produce the unicast responses U1, . . . Un back to the thin client aggregation server 11' described in FIG. 4. In summary, the thin client aggregation server 11' will receive an indication and GPS location from the thin client plug-in 6' whenever a listener tunes to or from one of the 15 ClearChannel internet radio stations. Alternately, for long listening sessions, the thin client may send location updates, even if the station has not changed (not shown in FIG. 4).

9. The thin client aggregation server 11' summaries these received statistics for each radio station and returns the data as shown by feedback A to the radio station function for royalty calculations and listener locations/densities for identifying appropriate ads. These statistics may be continuously transmitted back to the radio station or provided on a per request basis (i.e., the station may request the number of listeners between two timestamps for calculating royalty fees on a given song). For ad selection, the station may also request a specific number of listeners within a certain geographic defined region at a certain time. For example, a given vendor may have a rule set such that if more than 20 listeners are within a one mile radius of their restaurant, they will pay to fill an ad slot. Specific shapes may be used in the rule determination as described in U.S. application Ser. No. 12/189,861 entitled "Method for Location Based Advertising Based on Binding Bids to User Defined Arbitrary Shapes". In this particular embodiment, the aggregation server 11' would aggregate the unicast responses U1, . . . Un based upon a custom defined geographic shape by each radio station. The information fed back to the radio station would also include the identification of the custom defined geographic shape.

10. In addition to providing feedback as at A to the radio station, Verizon's aggregation server 11' may give direct feedback to vendors. For example, the restaurant vendor may receive notification short message service (SMS) text or other means when their ad is played and the number of listeners within the radius at ad play. The vendor may then light up an electronic billboard in front of the restaurant welcoming listeners of the specific ClearChannel classic rock radio station. Alternatively, an inspiring young entrepreneur may subscribe to receive notification of all ads and numbers of listeners from all of ClearChannel's radio stations at a given geographic location. The entrepreneur has an arrangement with one or more vendors to twirl signs on a street corner when their ads play one or more of the radio stations.

From the above-described use case Example, assuming a 10% bandwidth reservation for internet radio by wireless carriers and a potential 2% royalty, this would potentially yield a $2M license opportunity for each $1 B of wireless data revenue for a given carrier.

Additionally, the collection and usage of the aggregated statistics on a per tower basis and the ability to stream unique playlists and localized vendor ads to the tower may also generate licensing opportunities directly to large radio station owners.

The present invention has substantial opportunity for variation without departing from the spirit or scope of the present invention. For example, while the embodiments discussed herein are directed to a common secure client, the present invention is not limited thereto. A more secure scenario could use unique-to-device clients for secure decryption thereby leveraging the satellite radio protection scheme. However, per device overhead and maintenance would be much higher that with a common secure client. Moreover, instead of GPS location determination; tower triangulation or an alternate localized position system could be used.

It should be emphasized that the above-described embodiments of the invention are merely possible examples of implementations set forth for a clear understanding of the principles of the invention. Variations and modifications may be made to the above-described embodiments of the invention without departing from the spirit and principles of the invention. All such modifications and variations are intended to be included herein within the scope of the invention and protected by the following claims.

What is claimed is:

1. A system for per access-point streaming media customization and privacy protected feedback in a wireless network, comprising:
    means for encrypting real time streamed media content from a streaming media source;
    means for multicasting the streamed encrypted media content for availability to a user device for playback, the user device sending out unicast responses at the time of joining or dropping the multicast;
    means for aggregating the unicast responses in the form of a connect multicast state or a disconnect multicast state of the user device based on the joining or dropping of the multicast; and
    means for providing information back to the streaming media source based on the aggregated unicast responses.

2. The system of claim 1, wherein the streaming media source is an internet radio.

3. The system of claim 1, wherein the user device comprises a mobile device.

4. The system of claim 3, wherein the mobile device is one of a smart phone or a portable media device.

5. The system of claim 1, wherein the wireless network comprises a bandwidth constrained wide area network (WAN) connected IPv6 mobile network.

6. The system of claim 3, wherein each of the unicast responses from the mobile device further includes at least one of a unique mobile device identification (ID) or a location coordinate of the mobile device.

7. The system of claim 3, wherein each of the unicast responses from the mobile device further includes a unique mobile device identification (ID), a location coordinate of the mobile device, a streaming media source ID request, and a timestamp.

8. The system of claim 6, wherein the location coordinate is determined via a global positioning system (GPS).

9. The system of claim 1, wherein the streamed encrypted media content is encrypted with a digital rights management (DRM) key.

10. The system of claim 2, wherein the information provided back to the internet radio as the streaming media source includes at least one of a radio tower identification (ID), a timestamp, a channel selected, a channel de-selected or a channel global positioning position (GPS).

11. A method of per access-point streaming media customization and privacy protected feedback in a wireless network, the method comprising:
    encrypting real time streamed media content from a streaming media source;
    multicasting the streamed encrypted media content for availability to a user device for playback, the user device sending out unicast responses at the time of joining or dropping the multicast;
    aggregating the unicast responses in the form of a connect multicast state or a disconnect multicast state of the user device based on the joining or dropping of the multicast; and
    providing information back to the streaming media source based on the aggregated unicast responses.

12. The method of claim 11, wherein the streaming media source is an internet radio.

13. The method of claim 11, wherein the user device comprises a mobile device.

14. The method of claim 13, wherein the mobile device is one of a smart phone or a portable media device.

15. The method of claim 11, wherein the wireless network comprises a bandwidth constrained wide area network (WAN) connected IPv6 mobile network.

16. The method of claim 13, wherein each of the unicast responses from the mobile device further includes at least one of a unique mobile device identification (ID) or a location coordinate of the mobile device.

17. The method of claim 13, wherein each of the unicast responses from the mobile device further includes a unique mobile device identification (ID), a location coordinate of the mobile device, a streaming media source ID request, and a timestamp.

18. The method of claim 16, wherein the location coordinate is determined via a global positioning system (GPS).

19. The method of claim 11, wherein the streamed encrypted media content is encrypted with a digital rights management (DRM) key.

20. The method of claim 12, wherein the information provided back to the internet radio as the streaming media source includes at least one of a radio tower identification (ID), a timestamp, a channel selected, a channel de-selected or a channel global positioning position (GPS).

21. A mobile wireless access device, comprising:
    a network interface communicatively coupling the mobile wireless access device to a network server;
    a controller associated with the network interface and operative to:
        transmit location coordinate information, an access-point identification (ID), and a streaming media ID request to the network server;
        receive an encrypted streamed media multicast from the network server;
        receive a multicast unique key for streamed content decryption;
        decrypt the streamed content for playback by a player function;

transmit a successful connection and decryption of the streamed media multicast back to the network server; and transmit a termination of the connection of the streamed media multicast back to the network server.

22. A non-transitory computer readable medium comprising a program for instructing a system to:

encrypt real time streamed media content from a streaming media source;

multicast the streamed encrypted media content for availability to a user device for playback, the user device sending out unicast responses at the time of joining or dropping the multicast;

aggregate the unicast responses in the form of a connect multicast state or a disconnect multicast state of the user device based on the joining or dropping of the multicast; and provide information back to the streaming media source based on the aggregated unicast responses.

23. The computer readable medium of claim 22, wherein the streaming media source is an internet radio.

24. The computer readable medium of claim 22, wherein the user device comprises a mobile device.

25. The computer readable medium of claim 24, wherein the mobile device is one of a smart phone or a portable media device.

26. The computer readable medium of claim 22, wherein the wireless network comprises a bandwidth constrained wide area network (WAN) connected IPv6 mobile network.

27. The computer readable medium of claim 24, wherein each of the unicast responses from the mobile device further includes at least one of a unique mobile device identification (ID) or a location coordinate of the mobile device.

28. The computer readable medium of claim 24, wherein each of the unicast responses from the mobile device further includes a unique mobile device identification (ID), a location coordinate of the mobile device, a streaming media source ID request, and a timestamp.

29. The computer readable medium of claim 27, wherein the location coordinate is determined via a global positioning system (GPS).

30. The computer readable medium of claim 22, wherein the streamed encrypted media content is encrypted with a digital rights management (DRM) key.

31. The computer readable medium of claim 23, wherein the information provided back to the internet radio as the streaming media source includes at least one of a radio tower identification (ID), a timestamp, a channel selected, a channel de-selected or a channel global positioning position (GPS).

* * * * *